United States Patent
Athley et al.

(10) Patent No.: US 10,432,273 B1
(45) Date of Patent: Oct. 1, 2019

(54) ANTENNA ARRANGEMENT FOR TRANSMITTING REFERENCE SIGNALS

(71) Applicant: Telefonaktiebolaget LM Ericsson (publ), Stockholm (SE)

(72) Inventors: Fredrik Athley, Kullavik (SE); Sven Petersson, Sävedalen (SE); Andreas Nilsson, Göteborg (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 15/771,351

(22) PCT Filed: Apr. 12, 2018

(86) PCT No.: PCT/EP2018/059363
§ 371 (c)(1),
(2) Date: Apr. 26, 2018

(51) Int. Cl.
*H04B 7/06* (2006.01)
*H04B 7/0456* (2017.01)
*H04B 1/40* (2015.01)
*H01Q 3/36* (2006.01)
*H01Q 21/00* (2006.01)

(52) U.S. Cl.
CPC ............ *H04B 7/0469* (2013.01); *H01Q 3/36* (2013.01); *H01Q 21/0025* (2013.01); *H04B 1/40* (2013.01)

(58) Field of Classification Search
CPC . H04B 7/02; H04B 7/022; H04B 7/04; H04B 7/0408; H04B 7/0413; H04B 7/0469; H04B 7/069; H04B 7/0602; H04B 7/0617; H04B 1/40; H01Q 3/36; H01Q 21/0025
See application file for complete search history.

(56) References Cited

U.S. PATENT DOCUMENTS

| 5,724,044 A * | 3/1998 | Tanaka ................... H01Q 1/288 342/351 |
| 6,307,502 B1* | 10/2001 | Marti-Canales ..... G01K 11/006 342/351 |
| 2012/0244899 A1 | 9/2012 | Barker et al. |
| 2013/0022152 A1* | 1/2013 | McGowan ............. H01Q 1/246 375/299 |
| 2016/0308279 A1 | 10/2016 | Athley et al. |
| 2017/0310017 A1* | 10/2017 | Howard ............. H01Q 21/0006 |

(Continued)

OTHER PUBLICATIONS

3GPP, "3rd Generation Partnership Project; Technical Specification Group Radio Access Network; Study on channel model for frequency spectrum above 6 GHz (Release 14)"; 3GPP TR 38.900 V14.1.0 (Sep. 2016). (81 pages).

(Continued)

*Primary Examiner* — Siu M Lee
(74) *Attorney, Agent, or Firm* — Rothwell, Figg, Ernst & Manbeck, p.c.

(57) ABSTRACT

There is provided an antenna arrangement. The antenna arrangement comprises a first antenna array and a second antenna array. Each antenna array comprises antenna elements of a first polarization and antenna elements of a second polarization. The two antenna arrays are arranged to collectively be fed four signals, such that the antenna elements of each polarization at each antenna array is fed a respective one out of the four signals. The signal as fed to the antenna elements of the second polarization of the second antenna array is phase shifted 180° with respect to at least one of the other signals as fed to the other antenna elements.

21 Claims, 4 Drawing Sheets

(56) References Cited

U.S. PATENT DOCUMENTS

2017/0353864 A1* 12/2017 Bull ............... H04W 16/04
2018/0048364 A1* 2/2018 Girnyk ............ H04B 7/0456

OTHER PUBLICATIONS

International Search Report and Written Opinion dated Jan. 7, 2019 issued in International Application No. PCT/EP2018/059363. (12 pages).

* cited by examiner

ANTENNA ARRANGEMENT FOR TRANSMITTING REFERENCE SIGNALS

CROSS REFERENCE TO RELATED APPLICATION(S)

This application is a 35 U.S.C. § 371 National Stage of International Patent Application No. PCT/EP2018/059363, filed Apr. 12, 2018, designating the United States. The above identified application is incorporated by reference.

TECHNICAL FIELD

Embodiments presented herein relate to an antenna arrangement, a method, a radio transceiver device, a computer program, and a computer program product for transmitting reference signals.

BACKGROUND

In communications networks, there may be a challenge to obtain good performance and capacity for a given communications protocol, its parameters and the physical environment in which the communications network is deployed.

For example, for future generations of mobile communications systems frequency bands at many different carrier frequencies could be needed. For example, low such frequency bands could be needed to achieve sufficient network coverage for wireless devices and higher frequency bands (e.g. at millimeter wavelengths (mmW), i.e. near and above 30 GHz) could be needed to reach required network capacity. In general terms, at high frequencies the propagation properties of the radio channel are more challenging and beamforming both at the access node of the network and at the wireless devices might be required to reach a sufficient link budget.

The wireless devices could implement beamforming by means of analog beamforming, digital beamforming, or hybrid beamforming. Each implementation has its advantages and disadvantages. A digital beamforming implementation is the most flexible implementation of the three but also the costliest due to the large number of required radio chains and baseband chains. An analog beamforming implementation is the least flexible but cheaper to manufacture due to a reduced number of radio chains and baseband chains compared to the digital beamforming implementation. A hybrid beamforming implementation is a compromise between the analog and the digital beamforming implementations. As the skilled person understands, depending on cost and performance requirements of different wireless devices, different implementations will be needed.

Different antenna architectures for different frequency bands are being discussed for wireless devices. At high frequency bands (e.g. above 15 GHz) something called "panels" of antenna arrays are being discussed. These panels of antenna array may be uniform linear/rectangular arrays (ULAs/URAs), for example steered by using analog phase shifters. In order to get coverage from different directions, multiple panels of antenna array can be mounted on different sides of the wireless devices. Unless specifically stated, the terms antenna array and panels will hereinafter be used interchangeably.

According to the third generation partnership project (3GPP) suite of telecommunications standards, an antenna port is a logical entity rather than a physical entity that is defined by a transmitted reference signal. Such an antenna port may or may not correspond to a physical antenna port. An example of the former is when the reference signal defining the port is transmitted on a connector to an antenna element. An example of the latter is when the reference signal defining the port is transmitted using a digital beamformer. A reference signal, e.g., channel state information reference signal (CSI-RS) or demodulation reference signal (DMRS), can have one or several ports. For example, a CSI-RS resource could have two ports which could be transmitted over two different physical antenna ports.

FIG. 1 schematically illustrates an example architecture of an antenna arrangement 120. The antenna arrangement 120 consists of two antenna arrays 130a, 130b, each having antenna elements 140a, 140b of two polarizations p1, p2. Each antenna array 130a, 130b is thus connected to one transceiver unit (TXRU) per polarization, thus in total four panel ports. Each panel port (corresponding to one TXRU) is capable of generating a narrow steerable beam by means of analog beamforming. An analog distribution network with phase shifters is used to steer the transmission beam generated at each antenna array 130a, 130b. For example, a multi-panel codebook can be used to support co-phasing of the antenna arrays 130a, 130b.

The antenna arrangement 120 can be used to transmit one or two layers per panel in single-user (SU) or multi-user (MU) multiple input multiple output (MIMO) transmission. In this respect, in a system using MIMO transmission, multiple independent data streams can be transmitted in the same time-frequency radio resource, resulting in so-called spatial multiplexing. One such data stream is sometimes referred to as a layer. According to an example, a single layer (per polarization) is transmitted by coherent combining of the two antenna arrays 130a, 130b in order to increase the beamforming gain.

There are cases when transmission with a dual-panel antenna with four panel ports can result in some issues.

For rank-1 or rank-2 transmission, e.g., physical downlink shared channel (PDSCH) signalling, there are two alternatives when using an antenna arrangement 120 as in FIG. 1. A first alternative is to transmit using only a single one of the antenna arrays 130a, 130b. Thereby only half of the total transmit power is used, leading to reduced coverage. A second alternative is to transmit using both antenna arrays 130a, 130b using coherent combining. This requires the knowledge of how to co-phase the two antenna arrays 130a, 130b in order to steer the resulting beam in the correct direction. This knowledge can be obtained by uplink channel estimation if reciprocity holds or by feedback from the receiving radio transceiver device. For reciprocity-based uplink channel estimation, besides requiring time-division duplexing (TDD), this also requires that the transmit branches and the receive branches in the two antenna arrays are calibrated, which can be costly to achieve. Feedback-based uplink channel estimation can be achieved by using so-called multi-panel codebook reporting. However, this increases signaling overhead. Furthermore, the multi-panel codebook might not support one antenna port 3o per antenna array and polarization, and might therefore not even be used for the antenna arrangement in FIG. 1.

For transmission of so-called channels or signals that only use one or two antenna ports, e.g. a synchronization signal (SS) block (comprising PSS, SSS, and PBCH, where PSS is short for primary synchronization signal, SSS is short for secondary synchronization signal and PBCH is short for the physical broadcast channel) which are transmitted over one antenna port the transmitting radio transceiver device can perform a beam sweep to transmit the SS block in different directions. However, coherent combining of the two antenna arrays 130*a*, 130*b* may produce a very narrow transmission beam. For SS block transmission, a relatively wide transmission beam might be desired in order to achieve robustness against blockage and mobility of the receiving radio transceiver device. Furthermore, the number of possible transmission beams in an SS block beam sweep might be limited. Such a beam sweep should cover the entire coverage region of the transmitting radio transceiver device, and therefore the beams should not be too narrow. This could, for example, be the case when there is a limit on the number of beams in a beam sweep in which an SS block is transmitted. Furthermore, if the antenna arrays 130*a*, 130*b* are not calibrated relative to each other, the transmitting radio transceiver device has no knowledge of the resulting beam pointing direction when the same signal is fed to both antenna arrays 130*a*, 130*b*.

Hence, there are scenarios where coherent transmission across two antenna arrays 130*a*, 130*b* is not desired since it can create a too narrow transmission beam and/or control over the beam pointing direction is lost.

Hence, there is still a need for improved antenna arrangements for radio transceiver devices, such as network nodes or wireless devices.

SUMMARY

An object of embodiments herein is to provide an improved antenna arrangement that can be used in a radio transceiver device, such as a network node or a wireless device, and that does not suffer from the issues noted above, or at least where these issues are reduced or mitigated.

According to a first aspect there is presented an antenna arrangement. The antenna arrangement comprises a first antenna array and a second antenna array. Each antenna array comprises antenna elements of a first polarization and antenna elements of a second polarization. The two antenna arrays are arranged to collectively be fed four signals, such that the antenna elements of each polarization at each antenna array is fed a respective one out of the four signals. The signal as fed to the antenna elements of the second polarization of the second antenna array is phase shifted 180° with respect to at least one of the other signals as fed to the other antenna elements.

Advantageously this antenna arrangement can be used in a radio transceiver device, such as a wireless device, and that does not suffer from the issues noted above.

Advantageously this antenna arrangement allows for all power amplifiers to be fully utilized without causing unintended beamforming across the antenna arrays, leading to improved coverage, for example with respect to the antenna arrangement in FIG. 1.

According to a second aspect there is presented a radio transceiver device. The radio transceiver device comprises an antenna arrangement according to the first aspect.

According to a third aspect there is presented a method for transmitting signals. The method is performed by a radio transceiver device according to the second aspect. The method comprises transmitting signals by feeding the signals through the antenna arrangement.

According to a fourth aspect there is presented a computer program for transmitting reference signals, the computer program comprising computer program code which, when run on a radio transceiver device according to the second, causes the radio transceiver device to perform a method according to the third aspect.

According to a fifth aspect there is presented a computer program product comprising a computer program according to the fourth aspect and a computer readable storage medium on which the computer program is stored. The computer readable storage medium could be a non-transitory computer readable storage medium.

Other objectives, features and advantages of the enclosed embodiments will be apparent from the following detailed disclosure, from the attached dependent claims as well as from the drawings.

Generally, all terms used in the claims are to be interpreted according to their ordinary meaning in the technical field, unless explicitly defined otherwise herein. All references to "a/an/the element, apparatus, component, means, module, step, etc." are to be interpreted openly as referring to at least one instance of the element, apparatus, component, means, module, step, etc., unless explicitly stated otherwise. The steps of any method disclosed herein do not have to be performed in the exact order disclosed, unless explicitly stated.

BRIEF DESCRIPTION OF THE DRAWINGS

The inventive concept is now described, by way of example, with reference to the accompanying drawings, in which.

DETAILED DESCRIPTION

The inventive concept will now be described more fully hereinafter with reference to the accompanying drawings, in which certain embodiments of the inventive concept are shown. This inventive concept may, however, be embodied in many different forms and should not be construed as limited to the embodiments set forth herein; rather, these embodiments are provided by way of example so that this disclosure will be thorough and complete, and will fully convey the scope of the inventive concept to those skilled in the art. Like numbers refer to like elements throughout the description. Any step or feature illustrated by dashed lines should be regarded as optional.

Figure 1:
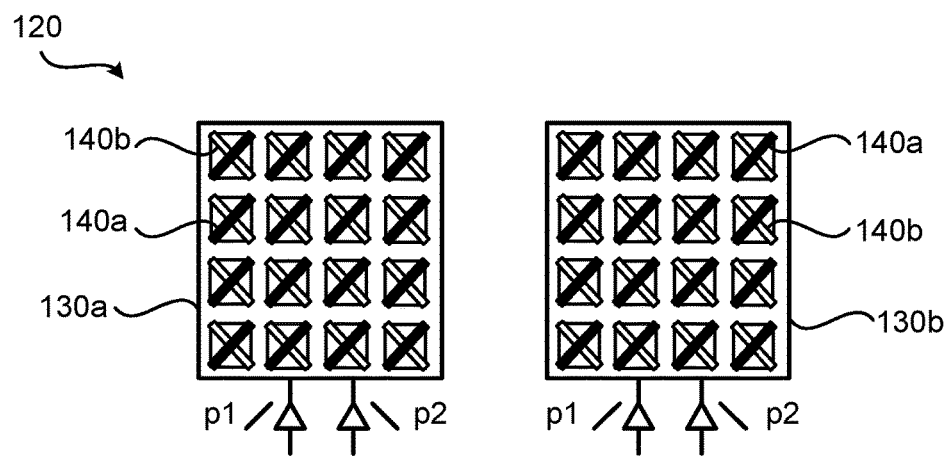
FIG. 1 schematically illustrates an antenna arrangement according to prior art.
Figure 2:
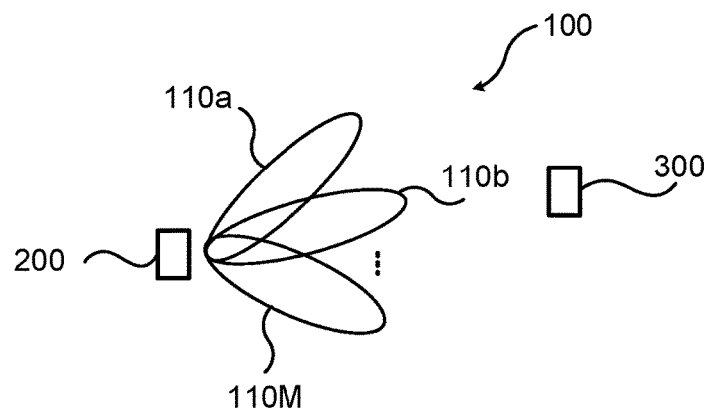
FIG. 2 is a schematic diagram illustrating a communications system according to embodiments.

FIG. 2 is a schematic diagram illustrating a communications system 100 comprising a radio transceiver device implemented as a radio access network node (such as the radio transceiver device 200) providing network access to a radio transceiver device implemented as a wireless device (such as the radio transceiver device 300). The radio access network node could be any of an access node, radio base station, base transceiver station, node B, evolved node B, g node B, access point, or the like. The wireless device could be any of a wireless device, mobile station, mobile phone, handset, wireless local loop phone, user equipment (UE), smartphone, laptop computer, tablet computer, wireless sensor, or the like.

The radio transceiver device 200 is assumed to comprise an antenna arrangement configured to transmit signals to the radio transceiver device 300 in M beams 110a, 110b, . . . , 110M. The beams 110a, 110b, . . . , 110M might all have the same width, or at least two of the beams 110a, 110b, . . . , 110M have mutually different widths. The radio transceiver device 200 is thus configured to communicate in M beams 110a, 110b, . . . , 110M (in contrast to omnidirectional beams).

As noted above there is a need for improved antenna arrangements for radio transceiver devices. Particularly, there is disclosed an antenna arrangement that enables unintentional, uncontrolled beamforming across two antenna arrays 130a, 130b of the antenna arrangement 120 in the radio transceiver device to be avoided.

Reference is now made to FIGS. 3, 4, 5, and 6. FIGS. 3, 4, 5, and 6 schematically illustrate antenna arrangements 120a, 120b, 120C, 120d according to embodiments.

The antenna arrangement 120a, 120b, 120c, 120d comprises a first antenna array 130a and a second antenna array 130b. Each antenna array 130a, 130b comprises antenna elements 130a of a first polarization p1 and antenna elements mob of a second polarization p2.

The two antenna arrays 130a, 130b are arranged to collectively be fed four signals, such that the antenna elements 140a, 140b of each polarization p1, p2 at each antenna array 130a, 130b is fed a respective one out of the four signals. As will be disclosed below, these four signals might originate from two common signals s1, S2 (as for the antenna arrangements 120a, 120b, 120d in FIGS. 3, 4, 6) or one single common signal s (as for the antenna arrangement 120C in FIG. 5).

The signal as fed to the antenna elements mob of the second polarization p2 of the second antenna array 130b is phase shifted 180° with respect to at least one of the other signals as fed to the other antenna elements.

By being arranged for transmission on orthogonal polarizations on the two antenna arrays 130a, 130b this antenna arrangement 120a, 120b, 120c, 120d enables non-coherent transmission across the two antenna arrays 130a, 130b.

Embodiments relating to further details of the antenna arrangement will now be disclosed.

In some aspects the antenna elements 140a, 140b are fed signals from an analog beamforming network. Particularly, according to an embodiment the antenna arrangement 120a, 120b, 120C, 120d further comprises an analog beamforming network. The signals are then fed to the antenna elements 140a, 140b from the analog beamforming network.

There could be different types of first and second polarizations p1, p2. In some aspects the first sub-array 130a and the second sub-array 130b have antenna elements 140a, 140b with mutually orthogonal polarizations. That is, according to an embodiment the first polarization p1 and the second polarization p2 are mutually orthogonal.

There could be different ways to configure the antenna arrangement 120a, 120b, 120c, 120d such that the signal as fed to the antenna elements mob of the second polarization p2 of the second antenna array 130b is phase shifted 180° with respect to at least one of the other signals as fed to the other antenna elements.

According to a first embodiment the signal as fed to the antenna elements mob of the second polarization p2 of the second antenna array 130b is phase shifted 180° with respect to at least the signal as fed to the antenna elements 140a of the first polarization p1 of the first antenna array 130a. This is the case for the antenna arrangements 120a, 120b, 120c in FIGS. 3, 4, 5.

According to a second embodiment the signal as fed to the antenna elements 140b of the second polarization p2 of the second antenna array 130b is phase shifted 180° with respect to at least the signal as fed to the antenna elements 140a of the first polarization p1 of the second antenna array 130b. This is the case for the antenna arrangement 120d in FIG. 6.

Figure 3:
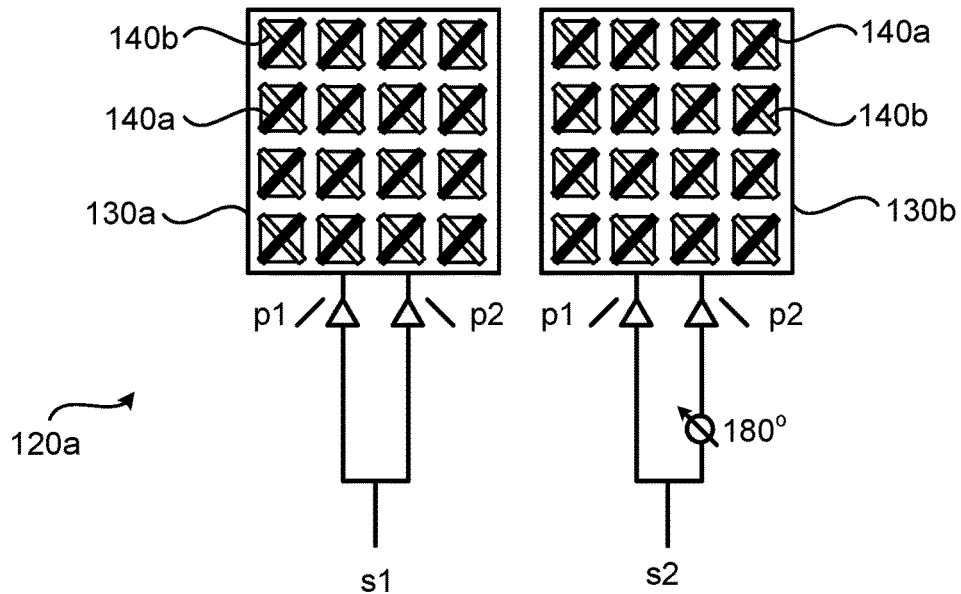
FIGS. 3, 4, 5, and 6 schematically illustrate antenna arrangements according to embodiments.

Specific reference is now made to the antenna arrangement 120a of FIG. 3. According to the antenna arrangement 120a in FIG. 3, the two signals as fed to the first antenna array 130a originate from a first common signal s1, and the two signals as fed to the second antenna array 130b originate from a second common signal s2. Further, the first common signal s1 represents a first layer signal, and the second common signal s2 represents a second layer signal, or the first common signal s1 and the second common signal Ω represent two ports of a reference signal, such as CSI-RS. FIG. 3 thus shows an embodiment in which one layer per antenna array 130a, 130b can be transmitted whilst utilizing all power amplifiers.

The signal s1 for the first layer is transmitted on the first antenna array 130a by feeding the two polarizations in phase, resulting in a vertical polarization of the transmitted signal. The signal s2 for the second layer is transmitted on the second antenna array 130b by feeding the two polarizations with a 180° phase difference, resulting in a horizontal polarization of the transmitted signal. Since the two panel ports on one antenna array 130a, 130b have orthogonal polarizations there will not be any additional beamforming of the panel ports within an antenna array 130a, 130b other than the beamforming already performed by the analog beamforming network. Furthermore, the two layers will be transmitted with orthogonal polarizations since the resulting polarization of the transmission from the first antenna array 130a is vertical and the resulting polarization of the transmission from the second antenna array 130b is horizontal.

Figure 4:
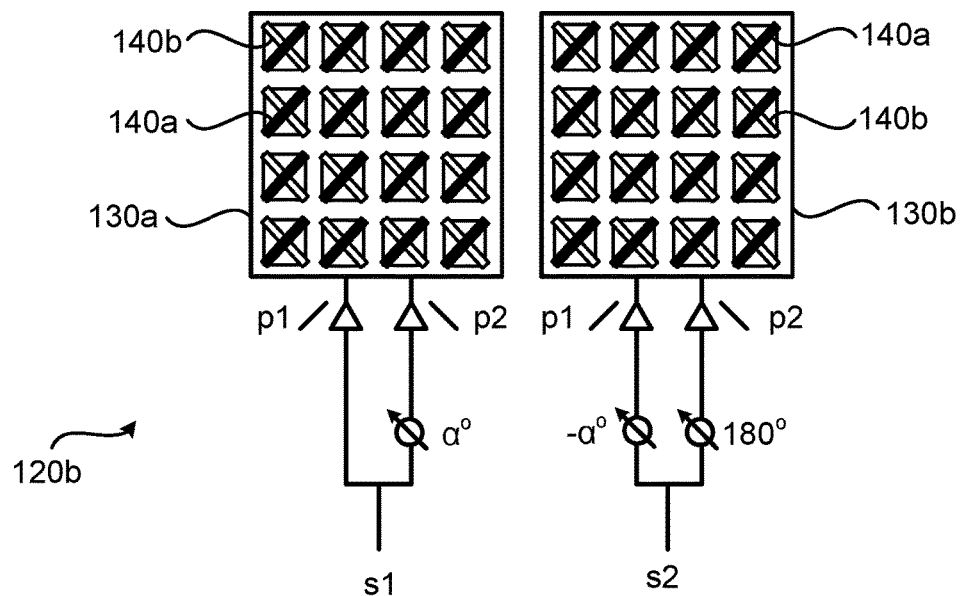

Specific reference is now made to the antenna arrangement 120b of FIG. 4. Other resulting polarization states for the antenna arrays 130a, 130b than linear horizontal polarization and vertical polarization can be obtained by introducing extra phase shifts, a, according to the antenna arrangement 120b in FIG. 4. According to the antenna arrangement 120b in FIG. 4, the signal as fed to the antenna elements 140b of the second polarization p2 of the first antenna array 130a is phase shifted α° with respect to the signal as fed to the antenna elements 140a of the first polarization p1 of the first antenna array 130a. Further, the signal as fed to the antenna elements 140a of the first polarization p1 of the second antenna array 130b is phase shifted −α° with respect to the signal as fed to the antenna elements 140a of the first polarization p1 of the first antenna array 130a. There could be different ways to determine the value of α. For example, α might have a channel dependent value.

The anti-symmetry of the applied phase shifts (α and −α, respectively,) ensures that the two layers are transmitted with orthogonal polarizations. In transmission schemes where one layer is transmitted per antenna array 130, 130b, the two antenna arrays 130a, 130b might have mutually different analog beamforming networks. However, the analog beamforming networks for the two polarizations within each antenna array 130a, 130b should be the same. Furthermore, the two polarizations within each antenna array 130a, 130b should be calibrated relative to each other.

Dual-polarization beamforming (as disclosed in WO2011/050866 A1 and WO2016/141961 A1) can be applied within each antenna array 130a, 130b using the analog beamforming network. In this way, beams with arbitrary beam widths can be created while maintaining full utilization of the power amplifiers and orthogonal polarization between the two transmission layers. Being able to create beams with different beam widths can be useful for a hierarchical beam search during beam management. For example, a first beam management process could comprise a beam scan of a wide angular sector using relatively wide beams, and a second beam management process for beam refinement could comprise using narrower beams in a restricted angular sector, as determined by the first beam management process. It might be advantageous that the two beams have orthogonal polarizations since then a two-port CSI-RS resource in beam management will span the polarization space, removing the risk of polarization mismatch.

Figure 5:
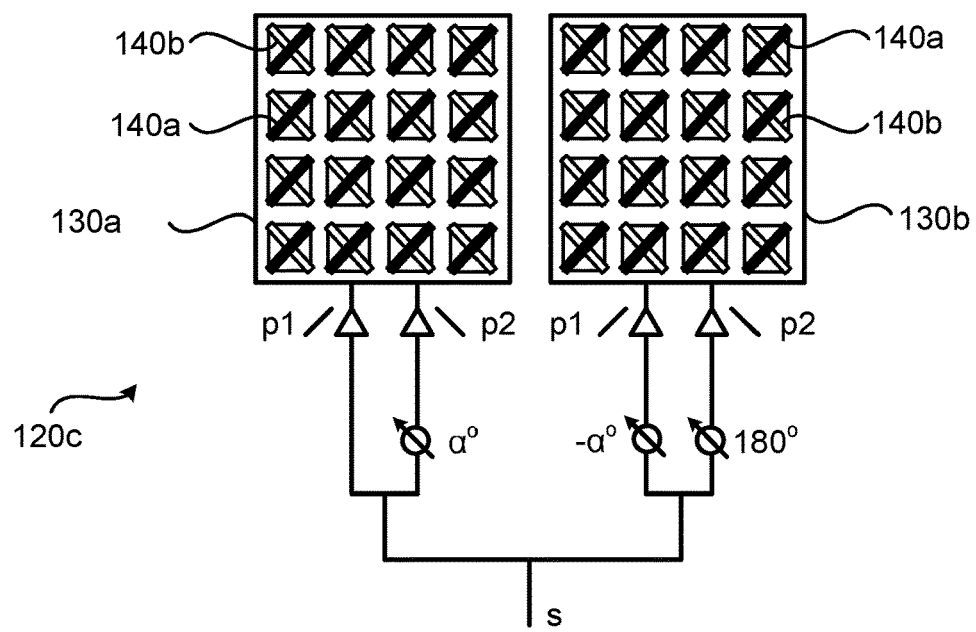

Specific reference is now made to the antenna arrangement 120C of FIG. 5. According to the antenna arrangement 120C in FIG. 5, the first common signal s1 and the second common signal Ω originate from one single common signal s. The single common signal s might then represent a single layer signal or a single-port reference signal. A rank-1 transmission utilizing all power amplifiers can be achieved with the antenna arrangement 120C illustrated in FIG. 5.

Since the resulting polarizations of the two antenna arrays 130a, 130b are orthogonal, the same signal s can be fed both antenna arrays 130a, 130b without any coherent combining of the two antenna arrays 130a, 130b. The resulting rank-1 transmission beam will have the same radiation pattern as a single one of the antenna arrays 130a, 130b and will fully utilize all power amplifiers. This might require the first polarization p1 on the first antenna array 130a to have the same analog beaming network as the second polarization p2 on the second antenna array 130b, and the second polarization p2 on the first antenna array 130a to have the same analog beaming network as the first polarization p1 on the second antenna array 130b.

The antenna arrangement 120C is further suitable for transmission of 1-port signals such as SS block or physical downlink control channel (PDCCH) signalling. Another usage can be to increase the coverage in beam management. For example, CSI-RS might be used with up to two antenna ports for beam management. A typical usage would then be to transmit the CSI-RS in one beam from one of the antenna arrays 130a, 130b with one CSI-RS port per polarization. In such a transmission, only half of the total transmission power would be used per beam since only one of two antenna arrays 130a, 130b are used in the transmission. With the antenna arrangement 120C, the total transmit power from both antenna arrays 130a, 130b can be used for one beam (and two polarizations). With the antenna arrays 130a, 130b this beam will have the same radiation pattern as the beam from a single antenna array 130a, 130b.

Figure 6:
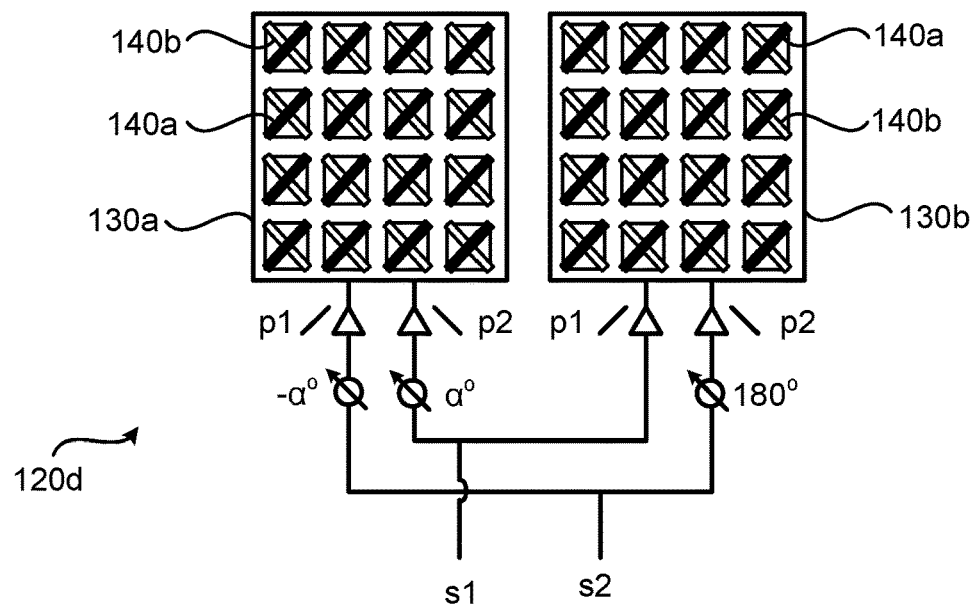

Specific reference is now made to the antenna arrangement 120d of FIG. 6. According to the antenna arrangement 120d in FIG. 6, the signal as fed to the antenna elements mob of the second polarization p2 of the first antenna array 130a is phase shifted $\alpha°$ with respect to the signal as fed to the antenna elements 140a of the first polarization p1 of the second antenna array 130b. Further, the signal as fed to the antenna elements 140a of the first polarization p1 of the first antenna array 130a is phase shifted $-\alpha°$ with respect to the signal as fed to the antenna elements 130a of the first polarization p1 of the second antenna array 130b. There could be different ways to determine the value of a. For example, as above, a might have a channel dependent value.

Further, according to the antenna arrangement 120d in FIG. 6, the signal as fed to the antenna elements 140a of the first polarization p1 of the second antenna array 130b and the signal as fed to the antenna elements mob of the second polarization p2 of the first antenna array 130a originate from a first common signal s1. Still further, the signal as fed to the antenna elements 140b of the second polarization p2 of the second antenna array 130b and the signal as fed to the antenna elements 140a of the first polarization p1 of the first antenna array 130a originate from a second common signal s2.

The antenna arrangement 120d of FIG. 6 is suitable for rank-2 transmission. Particularly, the first common signal s1 might represent a first layer signal, and the second common signal Ω might represent a second layer signal, or the first common signal s1 and the second common signal Ω might represent two ports of a reference signal.

According to the example of FIG. 6, the first layer signal uses one polarization p1 from one antenna array 130a and the orthogonal polarization p2 from the other antenna array 130b, and similarly for the second layer signal. In this case, the two layers will have orthogonal polarization only in the boresight direction. In other directions the polarization parallellity will vary with the direction since the transmission combines orthogonally polarized antenna ports having different phase centers.

Figure 7:
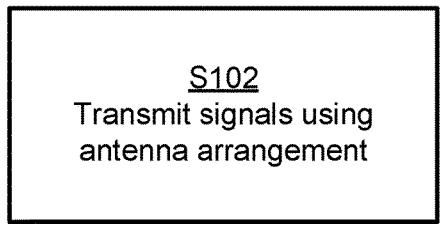
FIG. 7 is a flowchart of methods according to an embodiment.

FIG. 7 is a flowchart illustrating embodiments of methods for transmitting signals. The methods are performed by the radio transceiver device 200. The radio transceiver device 200 comprises an antenna arrangement 120a, 120b, 120c, 120d as disclosed above. The methods are advantageously provided as a computer program 1020.

S102: The radio transceiver device 200 transmits signals by feeding the signals through the antenna arrangement 120a, 120b, 120c, 120d.

The signals could be data signals, control signals, or reference signals. The reference signals could be any type of reference signals, such as CSI-RS, SS block, etc.

Figure 8:
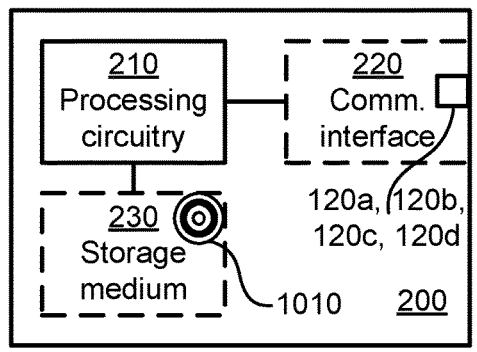
FIG. 8 is a schematic diagram showing functional units of a radio transceiver device according to an embodiment.

FIG. 8 schematically illustrates, in terms of a number of functional units, the components of a radio transceiver device 200 according to an embodiment. Processing circuitry 210 is provided using any combination of one or more of a suitable central processing unit (CPU), multiprocessor, microcontroller, digital signal processor (DSP), etc., capable of executing software instructions stored in a computer program product 1010 (as in FIG. 10), e.g. in the form of a storage medium 230. The processing circuitry 210 may further be provided as at least one application specific integrated circuit (ASIC), or field programmable gate array (FPGA).

Particularly, the processing circuitry 210 is configured to cause the radio transceiver device 200 to perform a set of operations, or steps, as disclosed above. For example, the storage medium 230 may store the set of operations, and the processing circuitry 210 may be configured to retrieve the set of operations from the storage medium 230 to cause the radio transceiver device 200 to perform the set of operations. The set of operations may be provided as a set of executable instructions.

Thus the processing circuitry 210 is thereby arranged to execute methods as herein disclosed. The storage medium 230 may also comprise persistent storage, which, for example, can be any single one or combination of magnetic memory, optical memory, solid state memory or even remotely mounted memory. The radio transceiver device 200 may further comprise a communications interface 220 at least configured for communications with another radio transceiver device 300. As such, the communications interface 220 may comprise one or more transmitters and receivers, comprising analogue and digital components. In this respect the radio transceiver device 200 comprises an antenna arrangement 120a, 120b, 120c, 120d as disclosed above and which thus might be part of the communications interface 220.

The processing circuitry 210 controls the general operation of the radio transceiver device 200 e.g. by sending data and control signals to the communications interface 220 and the storage medium 230, by receiving data and reports from the communications interface 220, and by retrieving data and instructions from the storage medium 230.

Other components, as well as the related functionality, of the radio transceiver device 200 are omitted in order not to obscure the concepts presented herein.

Figure 9:
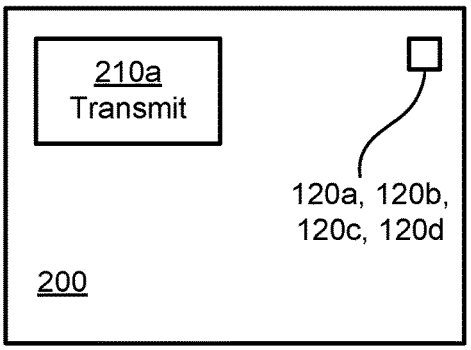
FIG. 9 is a schematic diagram showing functional modules of a radio transceiver device according to an embodiment.

FIG. 9 schematically illustrates, in terms of a number of functional modules, the components of a radio transceiver device 200 according to an embodiment. The radio transceiver device 200 of FIG. 9 comprises a transmit module 210a configured to perform step S102. In some aspects the transmit module 210a is implemented by the processing circuitry 210 and the communications interface 220. In some aspects the radio transceiver device 200 of FIG. 9 further comprises an antenna arrangement 120a, 120b, 120c, 120d as herein disclosed.

The radio transceiver device 200 of FIG. 9 may further comprise a number of optional functional modules. In general terms, the functional module 210a may in one embodiment be implemented only in hardware and in another embodiment with the help of software, i.e., the latter embodiment having computer program instructions stored on the storage medium 230 which when run on the processing circuitry makes the radio transceiver device 200 perform the corresponding steps mentioned above in conjunction with FIG. 9. It should also be mentioned that even though the modules correspond to parts of a computer program, they do not need to be separate modules therein, but the way in which they are implemented in software is dependent on the programming language used. Preferably, one or more or all functional modules 210a may be implemented by the processing circuitry 210, possibly in cooperation with the communications interface 220 and/or the storage medium 230. The processing circuitry 210 may thus be configured to from the storage medium 230 fetch instructions as provided by a functional module 210a and to execute these instructions, thereby performing any steps as disclosed herein.

The radio transceiver device 200 may be provided as a standalone device or as a part of at least one further device. In some aspects the radio transceiver device 200 is, or is provided in, a wireless device.

Figure 10:
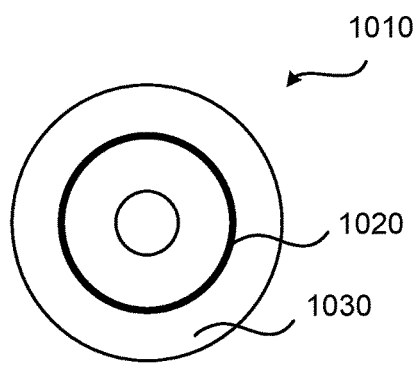
FIG. 10 shows one example of a computer program product comprising computer readable storage medium according to an embodiment.

FIG. 10 shows one example of a computer program product 1010 comprising computer readable storage medium 1030. On this computer readable storage medium 1030, a computer program 1020 can be stored, which computer program 1020 can cause the processing circuitry 210 and thereto operatively coupled entities and devices, such as the communications interface 220 and the storage medium 230, to execute methods according to embodiments described herein. The computer program 1020 and/or computer program product 1010 may thus provide means for performing any steps as herein disclosed.

In the example of FIG. 10, the computer program product 1010 is illustrated as an optical disc, such as a CD (compact disc) or a DVD (digital versatile disc) or a Blu-Ray disc. The computer program product 1010 could also be embodied as a memory, such as a random access memory (RAM), a read-only memory (ROM), an erasable programmable read-only memory (EPROM), or an electrically erasable programmable read-only memory (EEPROM) and more particularly as a non-volatile storage medium of a device in an external memory such as a USB (Universal Serial Bus) memory or a Flash memory, such as a compact Flash memory. Thus, while the computer program 1020 is here schematically shown as a track on the depicted optical disk, the computer program 1020 can be stored in any way which is suitable for the computer program product 1010.

The inventive concept has mainly been described above with reference to a few embodiments. However, as is readily appreciated by a person skilled in the art, other embodiments than the ones disclosed above are equally possible within the scope of the inventive concept, as defined by the appended patent claims.

The invention claimed is:

1. An antenna arrangement, the antenna arrangement comprising:
   a first antenna array; and
   a second antenna array, wherein
   the first antenna array comprises antenna elements of a first polarization and antenna elements of a second polarization,
   the second antenna array comprises antenna elements of the first polarization and antenna elements of the second polarization,
   the two antenna arrays are arranged to collectively be fed four signals, such that the antenna elements of each polarization at each antenna array is fed a respective one out of the four signals, and
   the signal as fed to the antenna elements of the second polarization of the second antenna array is phase shifted 180° with respect to at least one of the other signals as fed to the other antenna elements.

2. The antenna arrangement of claim 1, wherein the signal as fed to the antenna elements of the second polarization of the second antenna array is phase shifted 180° with respect to at least the signal as fed to the antenna elements of the first polarization of the first antenna array.

3. The antenna arrangement of claim 2, wherein the two signals as fed to the first antenna array originate from a first common signal s1, and wherein the two signals as fed to the second antenna array originate from a second common signal s2.

4. The antenna arrangement of claim 3, wherein the first common signal s1 represents a first layer signal and wherein the second common signal s2 represents a second layer signal, or wherein the first common signal s1 and the second common signal s2 represent two ports of a reference signal.

5. The antenna arrangement of claim 3, wherein the signal as fed to the antenna elements of the second polarization of the first antenna array is phase shifted $\alpha°$ with respect to the signal as fed to the antenna elements of the first polarization of the first antenna array.

6. The antenna arrangement of claim 3, wherein the signal as fed to the antenna elements of the first polarization of the second antenna array is phase shifted $-\alpha°$ with respect to the signal as fed to the antenna elements of the first polarization of the first antenna array.

7. The antenna arrangement of claim 5, wherein $\alpha$ has a channel dependent value.

8. The antenna arrangement of claim 3, wherein the first common signal s1 and the second common signal s2 originate from one single common signal s.

9. The antenna arrangement of claim 8, wherein the single common signal s represents a single layer signal or a single-port reference signal.

10. The antenna arrangement of claim 1, wherein the signal as fed to the antenna elements of the second polarization of the second antenna array is phase shifted 180° with respect to at least the signal as fed to the antenna elements of the first polarization of the second antenna array.

11. The antenna arrangement of claim 10, wherein the signal as fed to the antenna elements of the second polarization of the first antenna array is phase shifted $\alpha°$ with respect to the signal as fed to the antenna elements of the first polarization of the second antenna array.

12. The antenna arrangement of claim 10, wherein the signal as fed to the antenna elements of the first polarization of the first antenna array is phase shifted $-\alpha°$ with respect to the signal as fed to the antenna elements of the first polarization of the second antenna array.

13. The antenna arrangement of claim 11, wherein $\alpha$ has a channel dependent value.

14. The antenna arrangement of claim 10, wherein the signal as fed to the antenna elements of the first polarization of the second antenna array and the signal as fed to the antenna elements of the second polarization of the first antenna array originate from a first common signal s1.

15. The antenna arrangement of claim 10, wherein the signal as fed to the antenna elements of the second polarization of the second antenna array and the signal as fed to the antenna elements of the first polarization of the first antenna array originate from a second common signal s2.

16. The antenna arrangement of claim 15, wherein the first common signal s1 represents a first layer signal, and wherein the second common signal s2 represents a second layer signal, or wherein the first common signal s1 and the second common signal s2 represent two ports of a reference signal.

17. The antenna arrangement of claim 1, further comprising:
an analog beamforming network, and wherein the four signals are fed to the antenna elements from the analog beamforming network.

18. The antenna arrangement of claim 1, wherein the first polarization and the second polarization are mutually orthogonal.

19. A radio transceiver device comprising the antenna arrangement of claim 1.

20. A method for transmitting signals, the method being performed by a radio transceiver device, the method comprising:
transmitting signals by feeding the signals through the antenna arrangement of claim 1.

21. A computer program product comprising a non-transitory computer readable medium storing a computer program for transmitting signals, the computer program comprising computer code which, when run on processing circuitry of a radio transceiver device, causes the radio transceiver device to perform the method according to claim 20.

* * * * *

UNITED STATES PATENT AND TRADEMARK OFFICE
CERTIFICATE OF CORRECTION

PATENT NO. : 10,432,273 B1
APPLICATION NO. : 15/771351
DATED : October 1, 2019
INVENTOR(S) : Athley et al.

It is certified that error appears in the above-identified patent and that said Letters Patent is hereby corrected as shown below:

In the Specification

Column 2, Line 56, delete "port 3o per" and insert -- port per --, therefor.

Column 5, Line 21, delete "120C," and insert -- 120c, --, therefor.

Column 5, Line 25, delete "130a," and insert -- 140a, --, therefor.

Column 5, Line 26, delete "mob" and insert -- 140b --, therefor.

Column 5, Line 32, delete "s1, S2" and insert -- s1, s2 --, therefor.

Column 5, Line 35, delete "120C" and insert -- 120c --, therefor.

Column 5, Line 36, delete "mob" and insert -- 140b --, therefor.

Column 5, Line 49, delete "120C," and insert -- 120c, --, therefor.

Column 5, Line 60, delete "mob" and insert -- 140b --, therefor.

Column 5, Line 65, delete "mob" and insert -- 140b --, therefor.

Column 6, Line 19, delete "$\Omega$" and insert -- s2 --, therefor.

Column 6, Line 44, delete "a," and insert -- $\alpha$, --, therefor.

Column 6, Line 56, delete "a" and insert -- $\alpha$ --, therefor.

Column 6, Line 61, delete "130," and insert -- 130a, --, therefor.

Signed and Sealed this
Ninth Day of June, 2020

Andrei Iancu
*Director of the United States Patent and Trademark Office*

Column 7, Line 21, delete "120C" and insert -- 120c --, therefor.

Column 7, Line 22, delete "120C" and insert -- 120c --, therefor.

Column 7, Line 23, delete "Ω" and insert -- s2 --, therefor.

Column 7, Line 27, delete "120C" and insert -- 120c --, therefor.

Column 7, Line 41, delete "120C" and insert -- 120c --, therefor.

Column 7, Line 52, delete "120C," and insert -- 120c, --, therefor.

Column 7, Line 59, delete "mob" and insert -- 140b --, therefor.

Column 7, Line 66, delete "130a" and insert -- 140a --, therefor.

Column 8, Line 6, delete "mob" and insert -- 140b --, therefor.

Column 8, Line 17, delete "Ω" and insert -- s2 --, therefor.

Column 8, Line 18, delete "Ω" and insert -- s2 --, therefor.